United States Patent [19]

Cline, Sr.

[11] Patent Number: 5,947,347
[45] Date of Patent: Sep. 7, 1999

[54] MATERIAL BAGGING APPARATUS

[75] Inventor: Richard W Cline, Sr., Loganville, Ga.

[73] Assignee: GranTech Technologies, Inc., Loganville, Ga.

[21] Appl. No.: 09/039,142

[22] Filed: Mar. 13, 1998

[51] Int. Cl.⁶ ..................................... B65B 1/04
[52] U.S. Cl. ................. 222/627; 141/313; 298/7
[58] Field of Search .............. 141/114, 10, 231, 141/256, 313–317, 98; 222/626, 627; 414/507, 518, 519; 298/7

[56] References Cited

U.S. PATENT DOCUMENTS

3,552,346 1/1971 Garden ........................................ 141/72
5,353,851 10/1994 Cline ........................................ 141/313

Primary Examiner—Steven O. Douglas
Attorney, Agent, or Firm—Ryan, Kromholz & Manion

[57] ABSTRACT

A material filling apparatus which can be installed between the end of a cargo box and the tailgate of a dump truck. The attachment is adapted to engage, on its forward side, the latch mechanism at each side of the cargo compartment and, on its rearward side, the latch pins at each end of the tailgate, so that the attachment is supported between the end of the cargo compartment and the tailgate which is partly open.

11 Claims, 6 Drawing Sheets

MATERIAL BAGGING APPARATUS

FIELD OF INVENTION

The invention relates to apparatus for filling sandbags with free flowing solid materials. More particularly, the invention relates to apparatus attached or incorporated into a dump truck body for filling sandbags or similar containers with free flowing materials such as sand.

BACKGROUND OF THE INVENTION

Various devices have been proposed for filling sandbags. However, mechanical equipment such as a front end loader is often required to fill the hopper of a sandbag filling device. Thus such sandbag filling devices are not stand alone equipment, but instead require other equipment such as front end loaders to supply material to the bag-filling device or component.

Examples of prior art are, my U.S. Pat. No. 5,353,851, U.S. Pat. No. 3,552,346 issued to Garden and U.S. Pat. No. 4,044,921 issued to Caverly. In the formation of temporary or permanent barricades, bags filled with sand have been found to be the most expedient means of containing diverted water during a flood. Sandbags have also been used as barricades and revetments for the safety of military personnel. Sandbags are used for construction and the prevention of erosion around culverts, riverbanks and numerous similar applications. In emergencies the requirement to fill large quantities of sandbags for dike or levee construction often requires many people working under severe conditions.

SUMMARY OF THE INVENTION

An important object of the invention is to provide material bagging apparatus, the installation of which does not require modification of the host vehicle. An important aspect of the invention relates to providing apparatus that fills bags with material at a high rate of speed. The invention has the capability of filling material containing particles such as stones and aggregate up to 1.25 inch and less in size to fill sandbags or containers. This invention has the capability of filling bags with many types of free flowing solid materials including granular substances such as loose dirt, aggregates, stones, loose shale, various types of sand, feed grains, salt pellets or granules of various chemical substances. As in the case of the device shown in my above-mentioned patent, these materials can be self-loaded with the host vehicle such as a front-end loader. However, for use with a dump truck, any loader may be used to fill the truck cargo box. In accordance with the present invention, the advantages provided by this apparatus are adapted for attachment to a dump truck.

The attachment of the invention described herein is mounted between a truck cargo compartment and the tailgate thereof, in one embodiment. In accordance with the invention the hydraulic system of the host vehicle powers the bag filling apparatus. It is, thus, an important object of this invention to minimize the equipment requirements of the equipment needed to fill bags.

A further object of the invention is to provide an attachment, which can be installed on a dump truck, (or a loader with a multipurpose bucket) in as few as 15 minutes. The present invention is designed to permit the filling of large quantities of bags at a very rapid rate. The apparatus can be transported to various locations after attachment to the host vehicle without the use of heavy equipment.

In accordance with another important aspect, the invention requires few moving parts, therefore reducing potential for breakage and increased dependability. Another advantage is that a conveyor or loader of any size may be used to fill the host truck dump body. A dump truck is capable of traversing streams with several feet of water, deep mud, rough terrain, snow and other extreme conditions. Trucks can be loaded to capacity and often travel at normal highway speeds to the area of need. Additionally the dump truck retains the ability to be utilized for normal activities when not required to fill bags.

Briefly, apparatus is provided for filling sandbags from a truck having a dump box. The apparatus is in the form of an attachment for a host truck cargo compartment which includes a rotatable auger for conveying materials along its length toward its distal end. The auger is contained in an enclosure formed by a base plate, upstanding end plates which rotatably support the auger and a cage defining an enclosure and being provided with openings to screen materials entering said enclosure. The base plate is provided with a discharge opening adjacent to the distal end of the auger. A plurality of paddles are attached around the periphery of the distal end of the auger whereby an axial flow of materials along said auger is directed radially toward said opening. The attachment is adapted to be secured at the rear of a dump truck cargo box which has a tailgate pivotally attached at its top to the cargo box and a latch member on each side of the bottom of the box for receiving a pin affixed to each end of the tailgate. A pin is affixed to each end plate adjacent to the forward side of the base plate and extending laterally. The pins are adapted to be received in the latch members on each side of the box. A pin receiving latch or clamp is affixed to each end plate adjacent to the rearward side of the base plate. The pin receiving means are adapted to receive the pins affixed to each end of the tailgate, whereby the attachment is adapted to be supported between the rearward end of the cargo box and the tailgate when the tailgate is partly open.

Other objects and advantages will become apparent to those skilled in the art in view of the following description and accompanying drawings.

BRIEF DESCRIPTION OF THE DRAWINGS

FIG. 7 is an isometric view of the bag rest used in the practice of the invention, and, FIG. 8 is an isometric view of a foot actuator useable in conjunction with the invention.

DETAILED DESCRIPTION OF THE PREFERRED EMBODIMENT

Figure 1:
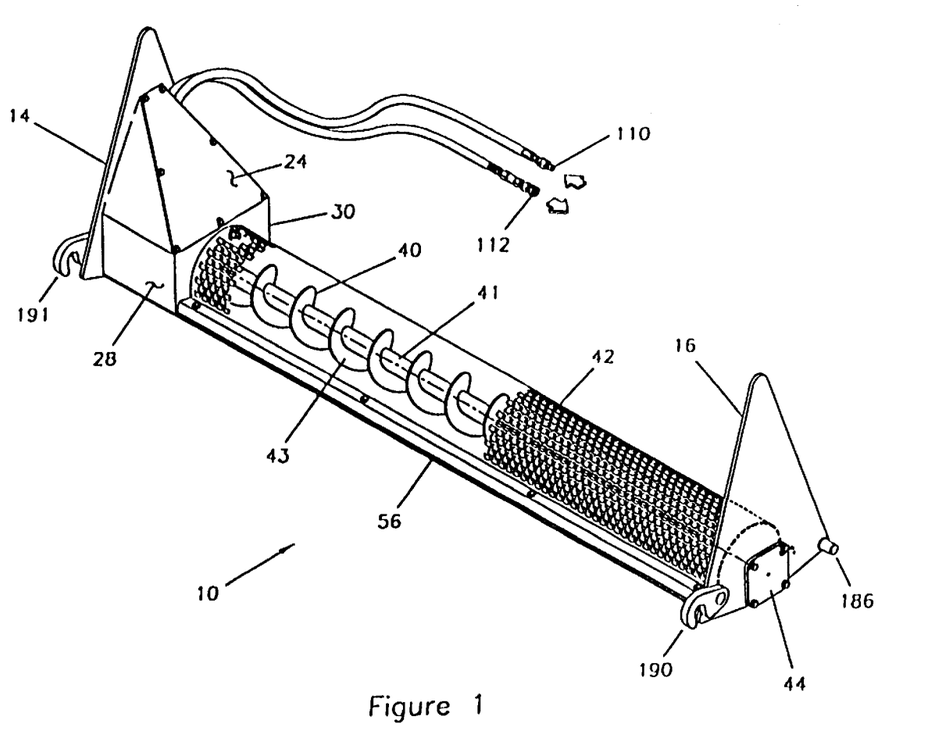
FIG. 1 is an isometric view of the material bagging apparatus of this invention with parts broken away for clarity.
Figure 5:
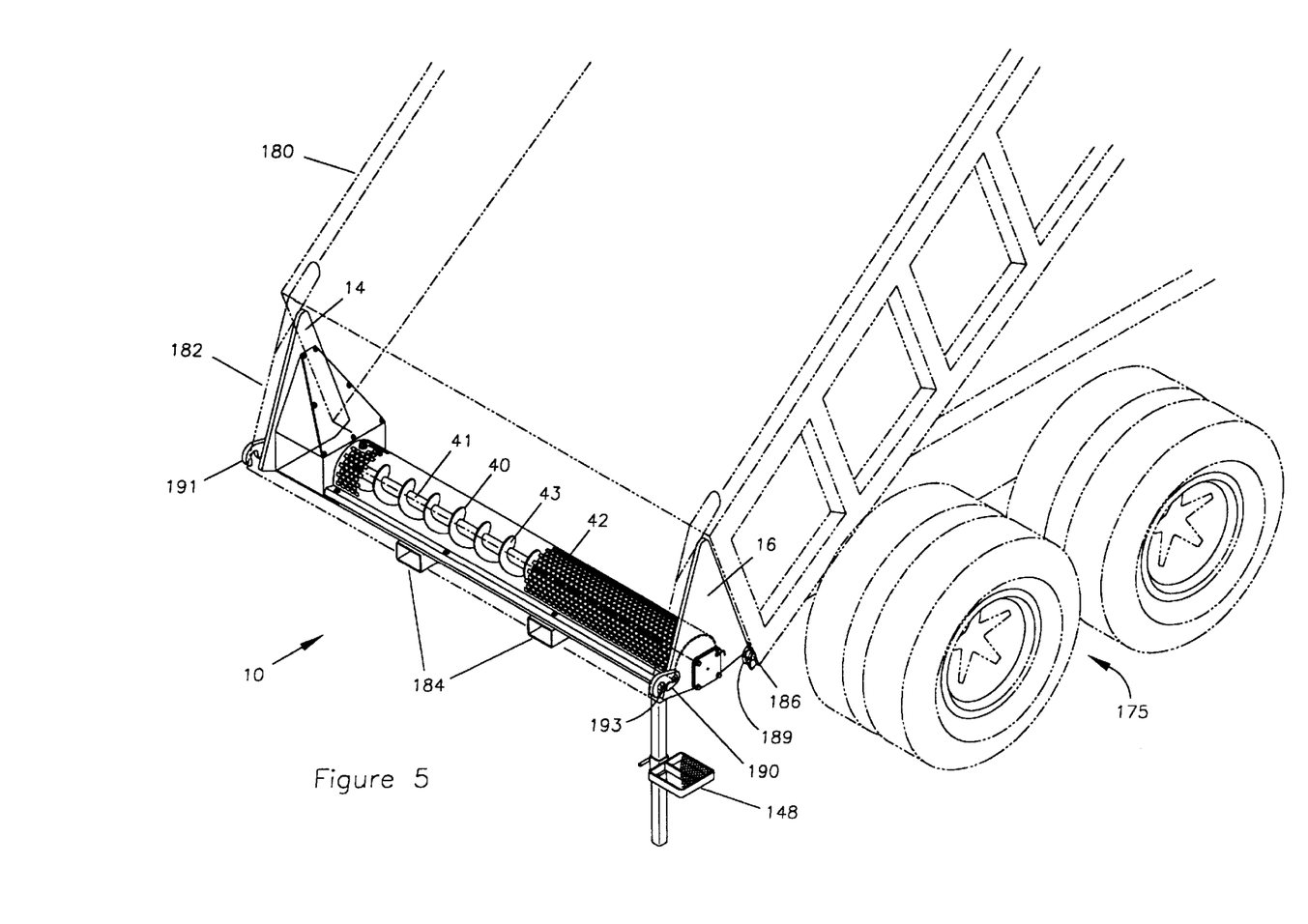
FIG. 5 is an isometric view of the apparatus attached to a truck, shown by phantom lines.
Figure 6:
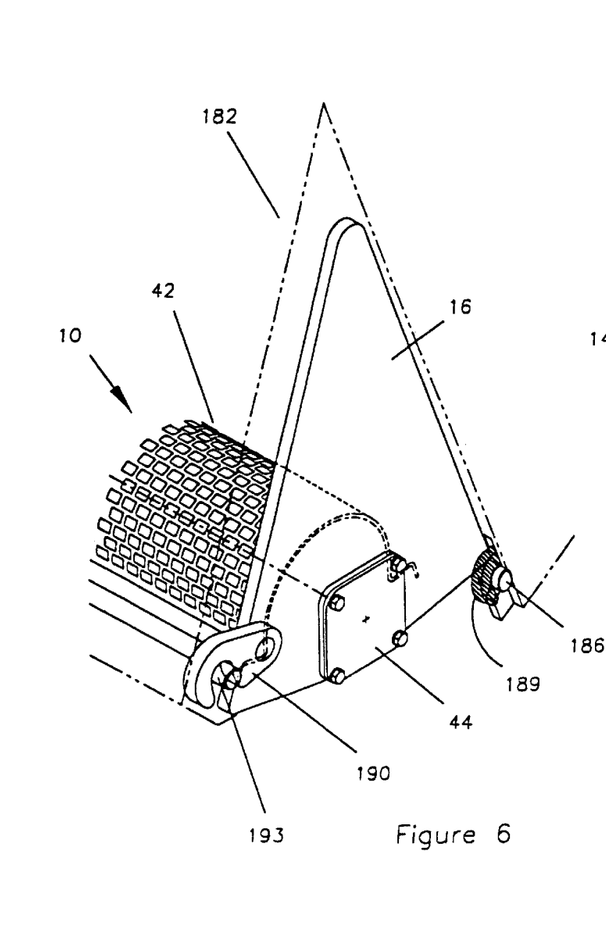
FIG. 6 is an fragmentary isometric view of the apparatus attached to dump truck components, shown by phantom lines.

Referring to the drawings and particularly FIGS. 1 and 5, bagging apparatus assembly 10 is adapted to be located between the cargo compartment 180 and the tailgate 182 of a truck 175. Apparatus 10 may be controlled by the bagging operator using a control lever or more preferably by a foot actuated switch 172 of switch assembly 170 shown in FIG. 8.

Main support plate 56, forms a base for the other components of assembly 10. A right end plate 16, and left end plate 14 form the ends of the bagging apparatus assembly 10. Rock guard 42 is preferably of a perforated precut steel and is generally semi-circular in cross section, running parallel to main support plate 56. Auger 40 rotates within the confines of rock guard 42 and support plate 56. A bearing end cap 44 retains bearing support 55, which supports a compliance bushing 53. A bearing 50 is compression fit into the compliance bushing 53 and is installed on the end of the shaft 41 of auger 40. Seal 51, is installed prior to bearing 50. Rock guard mounting fasteners 115, pass through washers 114, through pre-drilled holes in the rock guard 42 and then through pre-drilled holes in main support plate 56.

Figure 2:
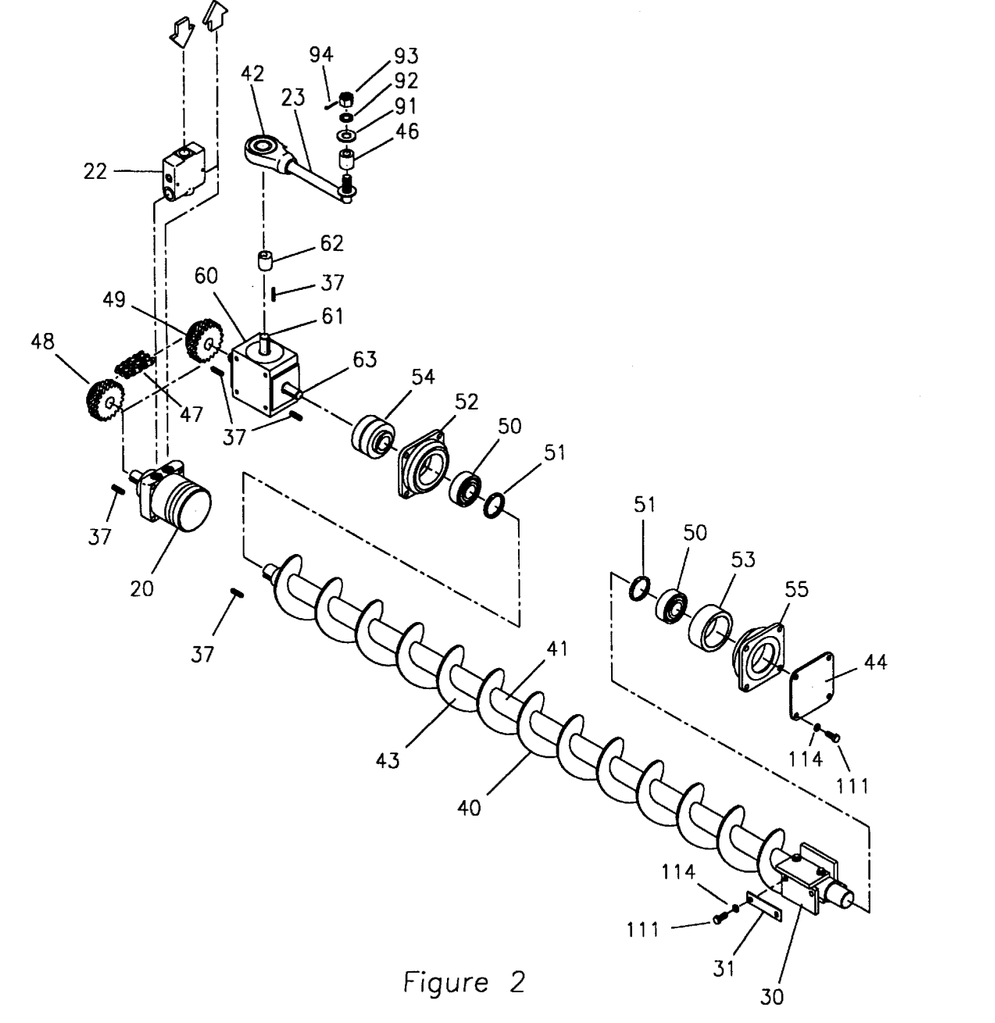
FIG. 2 is an exploded isometric view of the moving part components of the material bagging apparatus.
Figure 3:
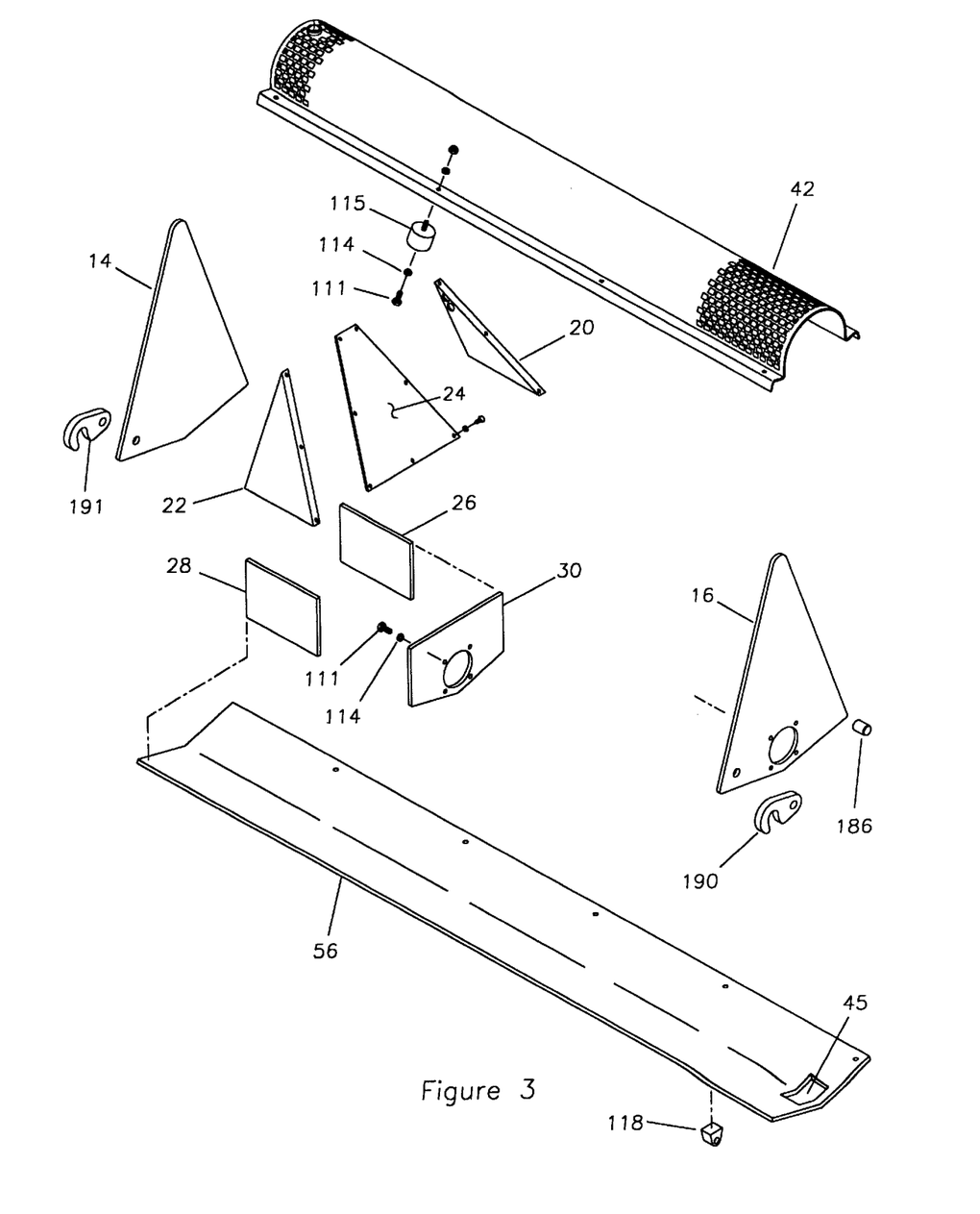
FIG. 3 is an exploded isometric view of the housing components of the apparatus.

As seen in FIG. 2, auger 40 may have paddles 30 attached thereto at its discharge end. Paddles 30 are held in place by metal strips 31, which are attached by fasteners 111 and 114. The auger paddles function is to change the direction of the material from an axial flow to a 90-degree radial flow relative to the auger 40.

A hydraulic motor 20 is provided to rotate auger 40 and is mounted to plate 28. The motor 20, has a spur gear 48 attached to its output shaft. The motor 20 can be hydraulic or electrical, as desired. A gearbox 60 is supported by main support plate 56 and a driven spur gear 49, is attached to the input of the gearbox 60. Motor 20, drives a chain 47 which, in turn, drives the input shaft of gearbox 60. The gearbox 60 may consist of a straight through drive having a 1 to 1 ratio. The gearbox 60 output shaft 63 is attached to a coupling 54 to transmit power to auger 40. A bearing retainer 52 is attached to support plate 30 and retains bearing 50 and seal 51. The bearing 50, is identical to that at the discharge end and preferably is designed to permit misalignment of the auger 40 during assembly.

Hydraulic flow control valve 22 is adjustable by a small lever. The flow control valve 22 controls the rotational speed of auger 40 thus controlling the discharge rate of free flowing material through discharge opening 45.

A second output shaft 61 of gearbox 60 is arranged at 90 degrees from output shaft 63. Shaft 61 gearbox supports a mechanism to oscillate the rock guard 42. An eccentric member 62 is keyed to shaft 61. The eccentric 62 is preferably pressure fit into a bearing 45, which is attached to support rod 23. Support rod key 94, fastener 93, lock washer 92, flat washer 91 and rubber bushing 46 are designed to withstand the forces required to shake and oscillate the rock guard 42. All gears and output shafts are preferably keyed together to prevent slippage or loss of torque to the driven members.

Referring to FIG. 5, two rectangular tubes 184 are welded to the bottom of support plate 56, to form sockets for receiving tines of a front end loader or similar device for lifting attachment 10 into position on a truck for use. The plates 28, 26, 30, 21, and 20 are welded together to act as supports for plate cover 24, and this assembly is preferably welded to support plate 56. The end plates 14 and 16 act as main supports for the resultant component mounting box, as described above. Various bolts 111 and washers 114 are used in the assembly of components of the apparatus, as shown. The rock guard 42 is preferably attached by resilient rubber mounts 115. The resilient mounts permit the rock guard 42 to be oscillated by the eccentric member 62.

Figure 4:
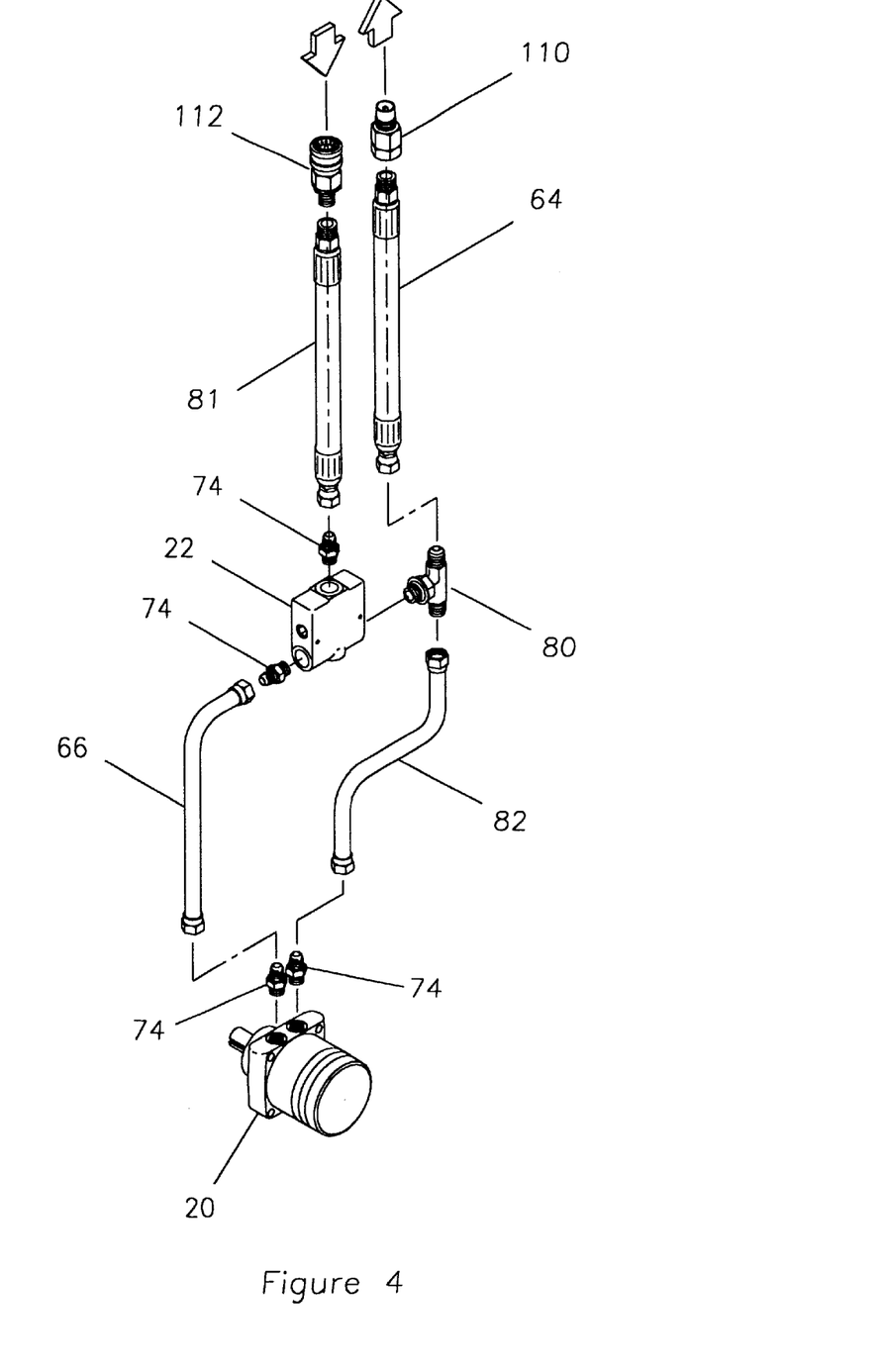
FIG. 4 is an exploded view of the hydraulic components.

Referring to FIG. 4, in a preferred embodiment, the quick disconnect coupling 110 and various other hoses and couplings are standard 0.75 inch hydraulic fittings. For example coupling 110 is threaded onto hose 64 which is in turn threaded in an T-coupling 80. Hose 82 transmits hydraulic power to motor 20, through fitting 74 which is coupled to motor 20 by hose 66. The quick coupler couplings 112 and 110 adapt the apparatus to the host vehicle hydraulic system which have like couplers supplying hydraulic power to the attachment of this invention.

Figures 7, 8:
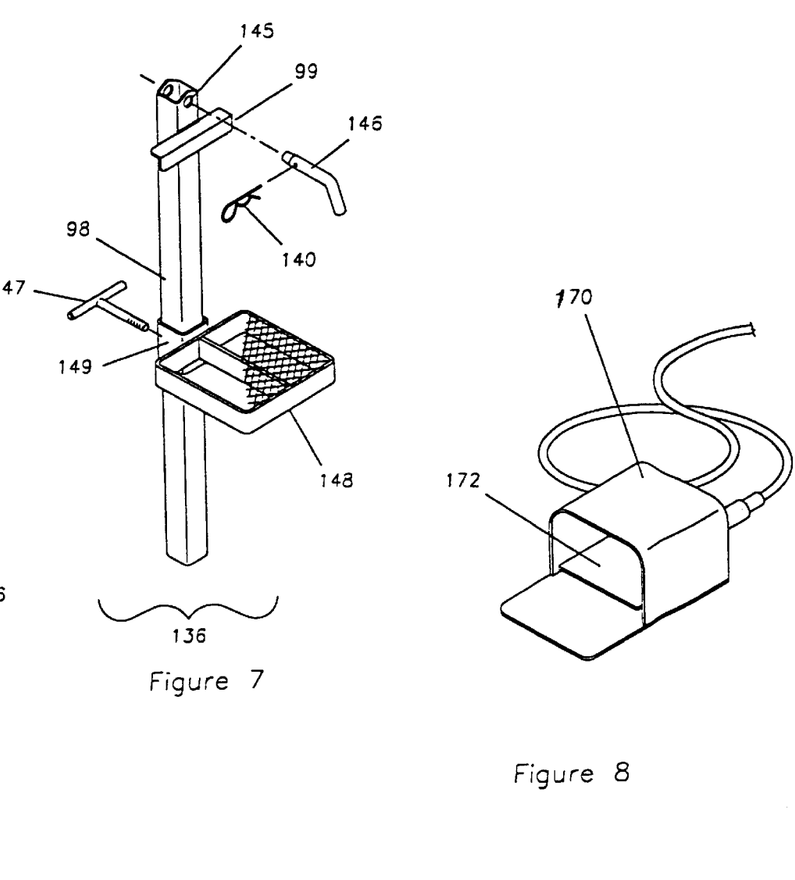

Referring to FIG. 7, the bag support stand 136 includes a rigid square tube 98 which may be supported on a suitable base. Pin 146 secures the stand to a bracket 118 and is secured by a cotter pin 140 or similar fastener. A bag hook 99, which can be a piece of angle iron welded to the upper portion of the stand 98 is provided for support of bags during operation. The bag support stand 136 also incorporates a bag support platform 148, which may consist of a steel frame supporting expanded lightweight steel. A supporting collar 149 may consist of a steel tube with an inner diameter sized to permit the collar 149 to slide over the tube 98. Collar 149 may have a threaded hole to accommodate a threaded fastening member 147.

While a hydraulic motor 20, has been shown by way of example, auger 40 and oscillator 62 can be driven by alternate drive mechanisms, instead. For example, an electric motor driven by electrical power supplied through appropriate insulated conductive wires can be used in place of hydraulic motor 20.

Referring again to FIG. 5, the end plates 14 and 16 are adapted for attachment of the device to dump trucks. On the end plates 14 and 16, are attached latches or safety locks 191 and 190, respectively. The invention when modified for attachment to a dump truck between the rear of cargo compartment 180 and tailgate 182. The latches 190, 191 engage standard locking pins 193 provided on each end of tailgate 182 for the purpose of locking into mating latches 189 attached to the rear of cargo compartment 180. The end plates 14 and 16 connect to the truck cargo compartment 180 by means of pins 186 provided on each side of the body opening, which are received by latches 189. The rear of the bagging device of this invention is equipped with similar latches or locking devices 190, 191 at each side to engage pins 192 which are affixed to each end of tailgate, thereby securing the device to the truck.

The sandbag rest 148 is vertically adjustable, as noted, and is held in place by pin 146 which passes through an opening inbracket 118 which is affixed to the main support plate 56. A support base for the sandbag rest assembly is optional, but not required, for filling sandbags from a dump truck.

OPERATION

Referring to the drawings and particularly, again to FIG. 5, the material filling apparatus fits between the confines of a dump truck cargo box 180 and tailgate 182. Material flows by gravity as the cargo box 180 is tilted and is received in the filling apparatus. The material is delivered to the discharge opening 45, by means of auger 40, which is rotated by the hydraulic motor 20. Hydraulic pressure and fluid flow to power the motor is supplied from the on board hydraulic system of the host vehicle. Discharge aperture 45 permits the displaced material to fall free from the assembly into a bag placed below the aperture and supported on bag rest 148. Eccentric 62 causes a vibration of the rock guard 42, which acts to screen out large particles. It is important to shake the rock guard sufficiently to prevent the material from becoming solid or clumping, thus allowing the material to flow freely down through the rock guard 42 toward the auger 40.

Referring to FIGS. 1, 2 and 5, the auger 40 functions to displace material by its spiral flutes 43 affixed to the center shaft 41. The bearing 50 is outboard of the paddles 30 and maintains a true alignment and ease of rotation for the auger 40. The bearing 50 is inserted into the reliance bushing 53 and inserted into bearing support 55 which secures bearing 50 in place.

The rock guard 42 is installed over the auger 40, to prevent oversized material from damaging the auger 40. a secondary purpose of the rock guard 42 is, as a safety precaution, to prevent operators from coming in contact with the auger.

The paddles 30 provide a means to change the direction of flow of material from the axial to the radial direction. The material travels with the auger 40 at a high rate of speed and must rapidly change direction in order to fill sandbags in two to three seconds.

Referring to FIG. 5, quick disconnect coupling 110 permits a union between the material bagging apparatus assembly and the host vehicle. This type of connection prevents contaminants from entering the hydraulic system when connected or disconnected. The hydraulic hose pressure effects flow of oil to the control valve hydraulic 22. The control valve 22 provides a means of controlling the hydraulic flow rate to the operational motor down stream within the circuit.

The flow of sand to a bag or other containers is started and stopped by starting and stopping motor 20, and hence the rotation of auger 40. This can be accomplished by having control valve 22 actuated by foot control unit 170 so that the person filling bags can start and stop the turning and rate of rotation of the auger 40. Other means can optionally be provided for controlling the flow of materials.

It is thus, seen that the material filling apparatus of this invention provide a highly, very rapid device which can fill large quantities of bags and containers. It can fill bags and containers or aggregate up to 1.25 inch in diameter. It contains a very small number of moving parts, making it very durable and easy to use. The time to install the invention on a dump truck is typically about 15 minutes.

Although the foregoing description contains considerable specificity, this should not be construed as limiting the scope of the invention, but as merely providing illustrations of the preferred embodiments of this invention. Thus, the scope of the invention should be determined by the appended claims and their legal equivalents, rather than by the specific examples given.

What is claimed is:

1. Apparatus for filling containers from a truck cargo box comprising an attachment for receiving and dispensing free flowing material and being adapted to be secured at the rear of a dump truck cargo box which has a tailgate pivotally attached at its top to the cargo box and a latch member on each side of said box at the bottom thereof for receiving a pin affixed to each end of said tailgate, a source of power and means to transmit said power to a motor, said attachment including a rotatable auger, having a first terminal end and a distal end, for conveying material along its rotational axis toward said distal end said first terminal end being rotatably driven by said motor, said auger being supported on a base plate located below said auger, said base plate having a forward side and a rearward side and having upstanding end members located at opposite ends thereof, said end members being provided with openings which rotatably support said auger, said attachment being provided with a discharge opening adjacent to the distal end of said auger, a cage defining an enclosure enclosing said auger, said cage being provided with openings to screen the size of said materials entering said enclosure, a pin affixed to each end member adjacent to a side of said base plate and extending laterally therefrom, said pins being adapted to be received in said latch members on each side of said box, and a pin receiving latch on each end member adjacent to a side of said base plate opposite said pins, said pin receiving clam being adapted to receive said pin affixed to each end of said tailgate, whereby said attachment is adapted to be supported between the rearward end of said cargo box and said tailgate when said tailgate is partly open.

2. Apparatus according to claim 1 further comprising a gear box that includes an eccentric rotating body and means to rotate said body thereby causing said apparatus to oscillate to prevent said free flowing materials from adhering cohesively.

3. Apparatus according to claim 1 wherein said source of power comprises a hydraulic system or power take-off drive member of said truck.

4. Apparatus according to claim 1 wherein said cage is formed by flame or plasma cut elongated holes with a maximum dimension of about 1.25 inches.

5. Apparatus according to claim 4 wherein means is provided for oscillating said cage.

6. Apparatus for filling sandbags from a truck having a dump box comprising an attachment including a rotatable auger adapted to be secured at the rear of said cargo compartment and having a distal end and a driven end, said auger adapted for conveying free flowing materials toward its distal end, a motor attached to said auger for rotating the same, said motor being connected to a source of power, said auger being contained in an enclosure formed by a base plate located below said auger and upstanding end plates connected to opposite ends of said base plate, said end plates being provided with openings which rotatably support said auger, said base plate being provided with a discharge opening adjacent to the distal end of said auger, said attachment being adapted to be secured at the rear of a dump truck cargo box which has a tailgate pivotally attached at its top to the cargo box and a latch member on each side of said box at the bottom thereof for receiving a pin affixed to each end of said tailgate, a pin affixed to each end plate adjacent to the forward side of said base plate and extending laterally therefrom, said pins being adapted to be received in said latch members on each side of said box, and a pin receiving means affixed to each end plate adjacent to the rearward side of said base plate, said pin receiving means being adapted to receive said pin affixed to each end of said tailgate, whereby said attachment is adapted to be supported between the rearward end of said cargo box and said tailgate.

7. Apparatus according to claim 6 wherein the forward side of said base member is complementary to the rear surface of said cargo compartment.

8. Apparatus for filling sandbags from a truck having a dump box comprising an attachment for a host truck cargo compartment which truck, said attachment including a rotatable auger, adapted to be secured at the rear of said cargo compartment and having a distal end and being adapted for conveying materials along its length toward its distal end, a motor attached to said auger for rotating the same, said motor being connected to a source of power, said auger being contained in an enclosure formed by a base plate located below said auger and upstanding end plates connected to opposite ends of said base plate, said end plates being provided with openings which rotatably support said auger, said base plate being provided with a discharge opening adjacent to the distal end of said auger, and a cage defining an enclosure and being provided with openings to screen materials entering said enclosure, a plurality of paddles being attached around the periphery of the distal end of said auger whereby an axial flow of materials along said auger is directed radially toward said opening, said attachment being adapted to be secured at the rear of a dump truck cargo box which has a tailgate pivotally attached at its top to the cargo box and a latch member on each side of said box at the bottom thereof for receiving a pin affixed to each end of said tailgate, a pin affixed to each end plate adjacent to the forward side of said base plate and extending laterally therefrom, said pins being adapted to be received in said latch members on each side of said box, and a pin receiving means on affixed to each end plate adjacent to the rearward side of said base plate, said pin receiving means being adapted to receive said pin affixed to each end of said tailgate, whereby said attachment is adapted to be supported between the rearward end of said cargo box and said tailgate when said tailgate is partly open.

9. Apparatus according to claim 8 wherein said motor is a hydraulic motor.

10. Apparatus according to claim 8 wherein said motor is an electric motor.

11. Apparatus according to claim 8 wherein said base plate is welded to said end plates.

\* \* \* \* \*